US012567169B2

(12) United States Patent
Padgett et al.

(10) Patent No.: US 12,567,169 B2
(45) Date of Patent: Mar. 3, 2026

(54) ARTIFICIAL INTELLIGENCE SMOOTHED OBJECT DETECTION AND TRACKING IN VIDEO

(71) Applicant: Shopify Inc., Ottawa (CA)

(72) Inventors: Neil Leonard Padgett, Toronto (CA);
Russ Maschmeyer, Berkeley, CA (US);
Eric Andrew Florenzano, San
Francisco, CA (US); **Brennan
Letkeman, Calgary (CA); James Lepp**,
Ottawa (CA); Diego Macario Bello,
Montreal (CA)

(73) Assignee: Shopify Inc., Ottawa (CA)

( * ) Notice: Subject to any disclaimer, the term of this
patent is extended or adjusted under 35
U.S.C. 154(b) by 298 days.

(21) Appl. No.: 18/466,970

(22) Filed: Sep. 14, 2023

(65) Prior Publication Data

US 2025/0095185 A1      Mar. 20, 2025

(51) Int. Cl.
*G06K 9/00*      (2022.01)
*G06T 7/20*      (2017.01)
*G06T 7/70*      (2017.01)
*H04N 19/159*      (2014.01)

(52) U.S. Cl.
CPC .................. *G06T 7/70* (2017.01); *G06T 7/20*
(2013.01); *H04N 19/159* (2014.11)

(58) Field of Classification Search
CPC . G06T 2207/10016; G06T 2207/20081; G06T
2207/20084; G06T 7/20; G06T 7/70;
H04N 19/159
See application file for complete search history.

(56) References Cited

U.S. PATENT DOCUMENTS

| | | | |
|---|---|---|---|
| 2010/0251287 A1 | 9/2010 | Deshpande et al. | |
| 2012/0128242 A1* | 5/2012 | Hampapur | G11B 27/28 |
| | | | 382/165 |
| 2014/0343399 A1* | 11/2014 | Posse | A61B 5/7203 |
| | | | 600/410 |
| 2014/0359679 A1* | 12/2014 | Shivadas | H04N 21/23439 |
| | | | 725/90 |
| 2019/0130191 A1 | 5/2019 | Zhou et al. | |
| 2019/0130580 A1 | 5/2019 | Chen et al. | |
| 2021/0158536 A1* | 5/2021 | Li | G06V 20/46 |
| 2022/0036084 A1 | 2/2022 | Migdal | |
| 2022/0222832 A1* | 7/2022 | Fu | G06V 10/764 |
| 2022/0262011 A1 | 8/2022 | Zhang et al. | |

(Continued)

OTHER PUBLICATIONS

Bertasius, Gedas, and Lorenzo Torresani. "Classifying, segmenting,
and tracking object instances in video with mask propagation."
Proceedings of the IEEE/CVF Conference on Computer Vision and
Pattern Recognition. 2020. (Year: 2020).*

(Continued)

*Primary Examiner* — Hadi Akhavannik
(74) *Attorney, Agent, or Firm* — Rowand LLP

(57) ABSTRACT

Methods and systems for object detection and tracking in
video that use at least two different AI-assisted object
detection algorithms. A first AI-assisted object detection
algorithm selected to be used to detect an object in a video
frame and determine a mask defining location of the object
on the basis that the video frame is a keyframe. A second
AI-assisted object detection algorithm may be used to track
location of the mask in temporally subsequent frames until
the next keyframe is detected.

21 Claims, 5 Drawing Sheets

(56) References Cited

U.S. PATENT DOCUMENTS

| | | | |
|---|---|---|---|
| 2022/0309633 A1* | 9/2022 | Davies .................. | G06V 10/82 |
| 2023/0064431 A1 | 3/2023 | Kansara | |
| 2023/0109379 A1* | 4/2023 | Kreis ........................ | G06T 5/70 |
| | | | 382/157 |
| 2023/0162502 A1* | 5/2023 | Patel .................... | G06F 18/214 |
| | | | 382/103 |
| 2023/0230250 A1* | 7/2023 | Vianello .................. | G06T 7/70 |
| | | | 382/159 |
| 2023/0237775 A1* | 7/2023 | Portail ................ | G06V 10/774 |
| | | | 382/155 |

OTHER PUBLICATIONS

Zhu, Xizhou, et al. "Deep feature flow for video recognition." Proceedings of the IEEE conference on computer vision and pattern recognition. 2017. (Year: 2017).*

Kirillov, Alexander, et al. "Segment anything." Proceedings of the IEEE/CVF international conference on computer vision. 2023. (Year: 2023).*

International Searching Authority; PCT Written Opinion and International Search Report relating to Application No. PCT/CA2024/050247 dated May 8, 2024.

Yang, J. et al, "Track Anything: Segment Anything Meets Videos", arXiv Computer Vision and Pattern Recognition, pp. 1-7, [retrieved on May 1, 2021, retrieved from: https://arxiv.org/pdf/2304.11968] *entire document* dated Apr. 28, 2023.

"Emergent Correspondence from Image Diffusion", Tang, et al., https://arxiv.org/pdf/2306.03881.pdf, Jun. 6, 2023.

"Segment Anything", Kirillov, et al., https://arxiv.org/pdf/2304.02643.pdf, Apr. 5, 2023.

* cited by examiner

Come here, look!

*Tokenization*

58

[123] [456] [16] [789] [18]     56

60

Encoder
52

Feature vectors 62

Decoder
54

50

64     [741] [852] [16] [963] [18]

Viens ici, regarde!

ARTIFICIAL INTELLIGENCE SMOOTHED OBJECT DETECTION AND TRACKING IN VIDEO

TECHNICAL FIELD

The present disclosure relates to object detection and tracking in video and, in particular to artificial intelligence (AI) based smoothing of object detection and tracking.

BACKGROUND

The present disclosure relates to artificial intelligence (AI) systems used in object detection. AI is proving to be useful in detecting objects in images and segmenting the image to output mask data defining the object's location in the image.

AI-based object detection in images can be extended to use for object detection and tracking in video; however, the result can sometimes be jerky or shaky if used in video as the masking may sometimes jump location abruptly from frame-to-frame.

BRIEF DESCRIPTION OF THE DRAWINGS

Embodiments will be described, by way of example only, with reference to the accompanying figures wherein.

Like reference numerals are used in the drawings to denote like elements and features.

DETAILED DESCRIPTION OF EMBODIMENTS

Figure 1:
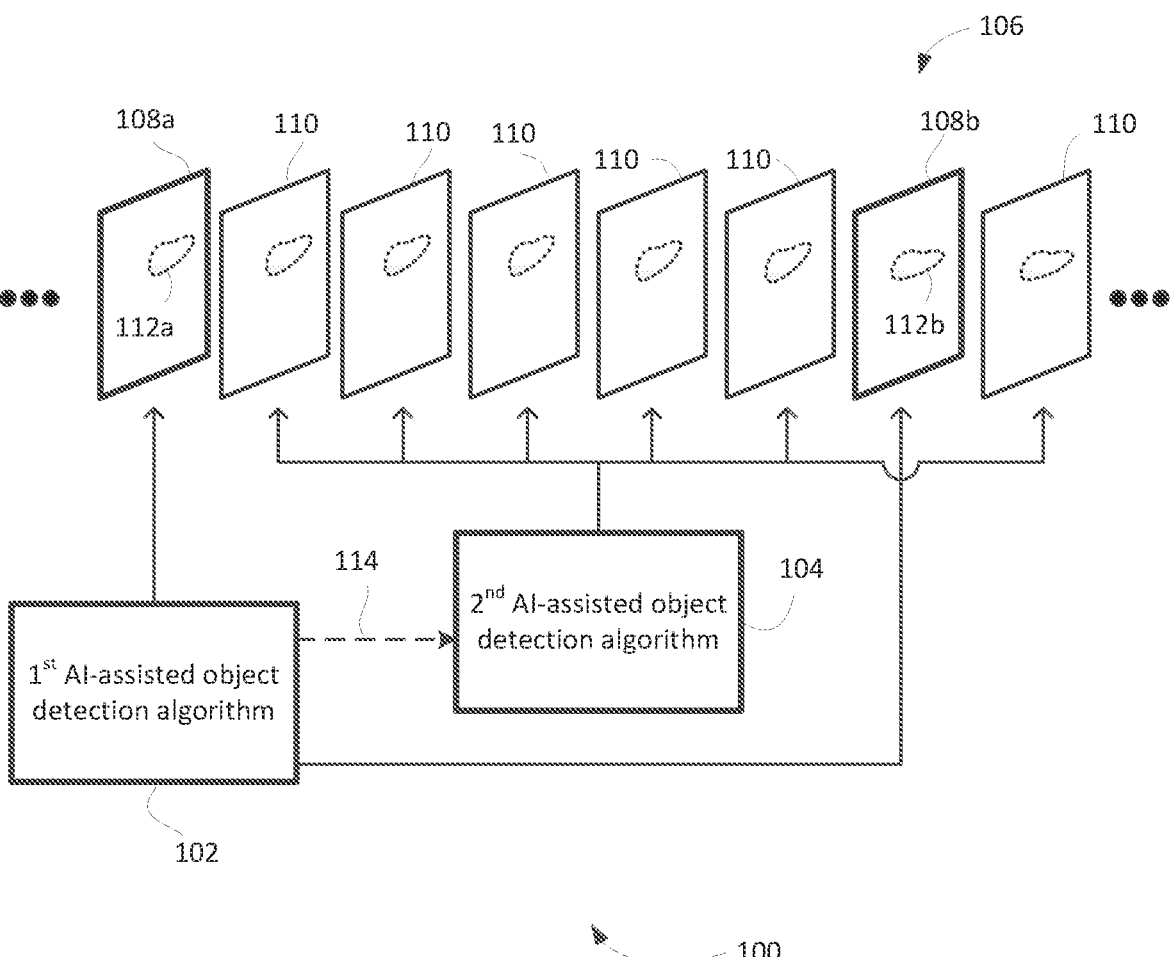
FIG. 1 illustrates an example system for AI-based object detection and tracking in video.

In an aspect, the present application discloses a computer-implemented method that includes identifying an object in a first video frame of a video by applying a first AI-assisted object detection algorithm that outputs a mask defining location of the object in the first video frame; tracking the mask and defining its location in at least one temporally subsequent frame of the video using a second AI-assisted object detection algorithm; and determining that a further frame of the video is a keyframe and, on that basis, re-applying the first AI-assisted objected detection algorithm to identify the object in the further frame and to output a next mask defining the location of the object in the further frame before repeating the tracking and defining using the second AI-assisted object detection algorithm for one or more frames subsequent to the keyframe.

In some implementations, the first AI-assisted object detection algorithm includes a promptable image segmentation model using prompt engineering.

In some implementations, the second AI-assisted object detection algorithm includes a diffusion-based generative model.

In some implementations, the first AI-assisted object detection algorithm determines the mask defining location of the object in the first video frame without reference to preceding frames of the video or previously-determined masks for the video, and the second AI-assisted object detection algorithm tracks the mask and defines its location in the at least one temporally subsequent frame of the video based on a location of the mask in a preceding frame and a determination of correspondence between the preceding frame and the at least one temporally subsequent frame.

In some implementations, determining that the further frame is a keyframe includes receiving keyframe identification data from at least one of a video encoder and a video decoder regarding the video. In some cases, the keyframe identification data includes data identifying frames within decoded video that are keyframes. In some cases, receiving keyframe identification data includes extracting the keyframe identification data from decoded video.

In some implementations, determining that the further frame is a keyframe in based on determining that the further frame was intra-coded by an encoder.

In some implementations, determining that the subsequent frame is a keyframe includes performing scene change analysis on the video and determining that the subsequent frame is a scene change.

In some implementations, determining that the further frame is a keyframe includes tracking the mask and defining its location in the further frame of the video using the second AI-assisted object detection algorithm, applying the first AI-assisted object detection algorithm to identify a new mask defining a location of the object in the further frame, comparing the new mask to the location of the mask determined by the second AI-assisted object detection algorithm, and determining that an error measurement exceeds a threshold value. In some cases, the operations of tracking the mask and defining its location in the further frame, applying the first AI-assisted object detection algorithm to identify the new mask, comparing the new mask to the location of the mask determined by the second AI-assisted object detection algorithm, and determining the error measurement are carried out only on frames of the video that were intra-coded.

In some implementations, the method may further include displaying the video on a display screen with a visual overlay indicating the object based on the mask and the next mask.

In another aspect, the present application discloses a computing system. The computing system includes a processor and a memory coupled to the processor. The memory stores computer-executable instructions that, when executed by a processor, configure the processor to carry out at least some of the operations of a method described herein.

In another aspect, the present application discloses a non-transitory, computer-readable medium storing processor-executable instructions that, when executed by a processor, are to cause the processor to carry out at least some of the operations of a method described herein.

Other example embodiments of the present disclosure will be apparent to those of ordinary skill in the art from a review of the following detailed descriptions in conjunction with the drawings.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . and . . . " is intended to cover any one or more of the listed elements, including any one of the listed elements alone, any sub-combination, or all of the elements, without necessarily excluding any additional elements, and without necessarily requiring all of the elements.

In the present application, the term AI model may be used to describe a machine learning model (MLM). An AI model may implement an object detection and/or tracking algorithm for identifying and tracking objects in images or video (i.e. a series of images). As will be described further below, the present application proposes methods and systems that employ two different AI-assisted object detection algorithms for identification and tracking of objects in video. One algorithm is tailored to object detection within a frame while the other is better at tracking an object from frame-to-frame.

To better illustrate additional details regarding the methods and systems of the present application some concepts relevant to generative AI models, neural networks, and machine learning (ML), are first discussed.

Generally, a neural network includes a number of computation units (sometimes referred to as "neurons"). Each neuron receives an input value and applies a function to the input to generate an output value. The function typically includes a parameter (also referred to as a "weight") whose value is learned through the process of training. A plurality of neurons may be organized into a neural network layer (or simply "layer") and there may be multiple such layers in a neural network. The output of one layer may be provided as input to a subsequent layer. Thus, input to a neural network may be processed through a succession of layers until an output of the neural network is generated by a final layer. This is a simplistic discussion of neural networks and there may be more complex neural network designs that include feedback connections, skip connections, and/or other such possible connections between neurons and/or layers, which need not be discussed in detail here.

A deep neural network (DNN) is a type of neural network having multiple layers and/or a large number of neurons. The term DNN may encompass any neural network having multiple layers, including convolutional neural networks (CNNs), recurrent neural networks (RNNs), and multilayer perceptrons (MLPs), among others.

DNNs are often used as ML-based models for modeling complex behaviors (e.g., human language, image recognition, object classification, etc.) in order to improve accuracy of outputs (e.g., more accurate predictions) such as, for example, as compared with models with fewer layers. In the present disclosure, the term "ML-based model" or more simply "ML model" may be understood to refer to a DNN. Training a ML model refers to a process of learning the values of the parameters (or weights) of the neurons in the layers such that the ML model is able to model the target behavior to a desired degree of accuracy. Training typically requires the use of a training dataset, which is a set of data that is relevant to the target behavior of the ML model. For example, to train a ML model that is intended to model human language (also referred to as a language model), the training dataset may be a collection of text documents, referred to as a text corpus (or simply referred to as a corpus). The corpus may represent a language domain (e.g., a single language), a subject domain (e.g., scientific papers), and/or may encompass another domain or domains, be they larger or smaller than a single language or subject domain. For example, a relatively large, multilingual and non-subject-specific corpus may be created by extracting text from online webpages and/or publicly available social media posts. In another example, to train a ML model that is intended to classify images, the training dataset may be a collection of images. Training data may be annotated with ground truth labels (e.g. each data entry in the training dataset may be paired with a label), or may be unlabeled.

Training a ML model generally involves inputting into an ML model (e.g. an untrained ML model) training data to be processed by the ML model, processing the training data using the ML model, collecting the output generated by the ML model (e.g. based on the inputted training data), and comparing the output to a desired set of target values. If the training data is labeled, the desired target values may be, e.g., the ground truth labels of the training data. If the training data is unlabeled, the desired target value may be a reconstructed (or otherwise processed) version of the corresponding ML model input (e.g., in the case of an autoencoder), or may be a measure of some target observable effect on the environment (e.g., in the case of a reinforcement learning agent). The parameters of the ML model are updated based on a difference between the generated output value and the desired target value. For example, if the value outputted by the ML model is excessively high, the parameters may be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the ML model typically is to minimize a loss function or maximize a reward function.

The training data may be a subset of a larger data set. For example, a data set may be split into three mutually exclusive subsets: a training set, a validation (or cross-validation) set, and a testing set. The three subsets of data may be used sequentially during ML model training. For example, the training set may be first used to train one or more ML models, each ML model, e.g., having a particular architecture, having a particular training procedure, being describable by a set of model hyperparameters, and/or otherwise being varied from the other of the one or more ML models. The validation (or cross-validation) set may then be used as input data into the trained ML models to, e.g., measure the performance of the trained ML models and/or compare performance between them. Where hyperparameters are used, a new set of hyperparameters may be determined based on the measured performance of one or more of the trained ML models, and the first step of training (i.e., with the training set) may begin again on a different ML model described by the new set of determined hyperparameters. In this way, these steps may be repeated to produce a more performant trained ML model. Once such a trained ML model is obtained (e.g., after the hyperparameters have been adjusted to achieve a desired level of performance), a third step of collecting the output generated by the trained ML model applied to the third subset (the testing set) may begin. The output generated from the testing set may be compared with the corresponding desired target values to give a final assessment of the trained ML model's accuracy. Other segmentations of the larger data set and/or schemes for using the segments for training one or more ML models are possible.

Backpropagation is an algorithm for training a ML model. Backpropagation is used to adjust (also referred to as update) the value of the parameters in the ML model, with the goal of optimizing the objective function. For example, a defined loss function is calculated by forward propagation of an input to obtain an output of the ML model and comparison of the output value with the target value. Backpropagation calculates a gradient of the loss function with respect to the parameters of the ML model, and a gradient algorithm (e.g., gradient descent) is used to update (i.e., "learn") the parameters to reduce the loss function. Back-propagation is performed iteratively, so that the loss function is converged or minimized. Other techniques for learning the parameters of the ML model may be used. The process of updating (or learning) the parameters over many iterations is referred to as training. Training may be carried out itera-tively until a convergence condition is met (e.g., a pre-defined maximum number of iterations has been performed, or the value outputted by the ML model is sufficiently converged with the desired target value), after which the ML model is considered to be sufficiently trained. The values of the learned parameters may then be fixed and the ML model may be deployed to generate output in real-world applica-tions (also referred to as "inference").

In some examples, a trained ML model may be fine-tuned, meaning that the values of the learned parameters may be adjusted slightly in order for the ML model to better model a specific task. Fine-tuning of a ML model typically involves further training the ML model on a number of data samples (which may be smaller in number/cardinality than those used to train the model initially) that closely target the specific task. For example, a ML model for generating natural language that has been trained generically on pub-lically-available text corpuses may be, e.g., fine-tuned by further training using the complete works of Shakespeare as training data samples (e.g., where the intended use of the ML model is generating a scene of a play or other textual content in the style of Shakespeare).

Some concepts in ML-based language models are now discussed. It may be noted that, while the term "language model" has been commonly used to refer to a ML-based language model, there could exist non-ML language models. In the present disclosure, the term "language model" may be used as shorthand for ML-based language model (i.e., a language model that is implemented using a neural network or other ML architecture), unless stated otherwise. For example, unless stated otherwise, "language model" encom-passes LLMs.

A language model may use a neural network (typically a DNN) to perform natural language processing (NLP) tasks such as language translation, image captioning, grammatical error correction, and language generation, among others. A language model may be trained to model how words relate to each other in a textual sequence, based on probabilities. A language model may contain hundreds of thousands of learned parameters or in the case of a large language model (LLM) may contain millions or billions of learned param-eters or more.

In recent years, there has been interest in a type of neural network architecture, referred to as a transformer, for use as language models. For example, the Bidirectional Encoder Representations from Transformers (BERT) model, the Transformer-XL model and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based lan-guage models are described herein, it should be understood that the present disclosure may be applicable to any ML-based language model, including language models based on other neural network architectures such as recurrent neural network (RNN)-based language models.

Figure 5:
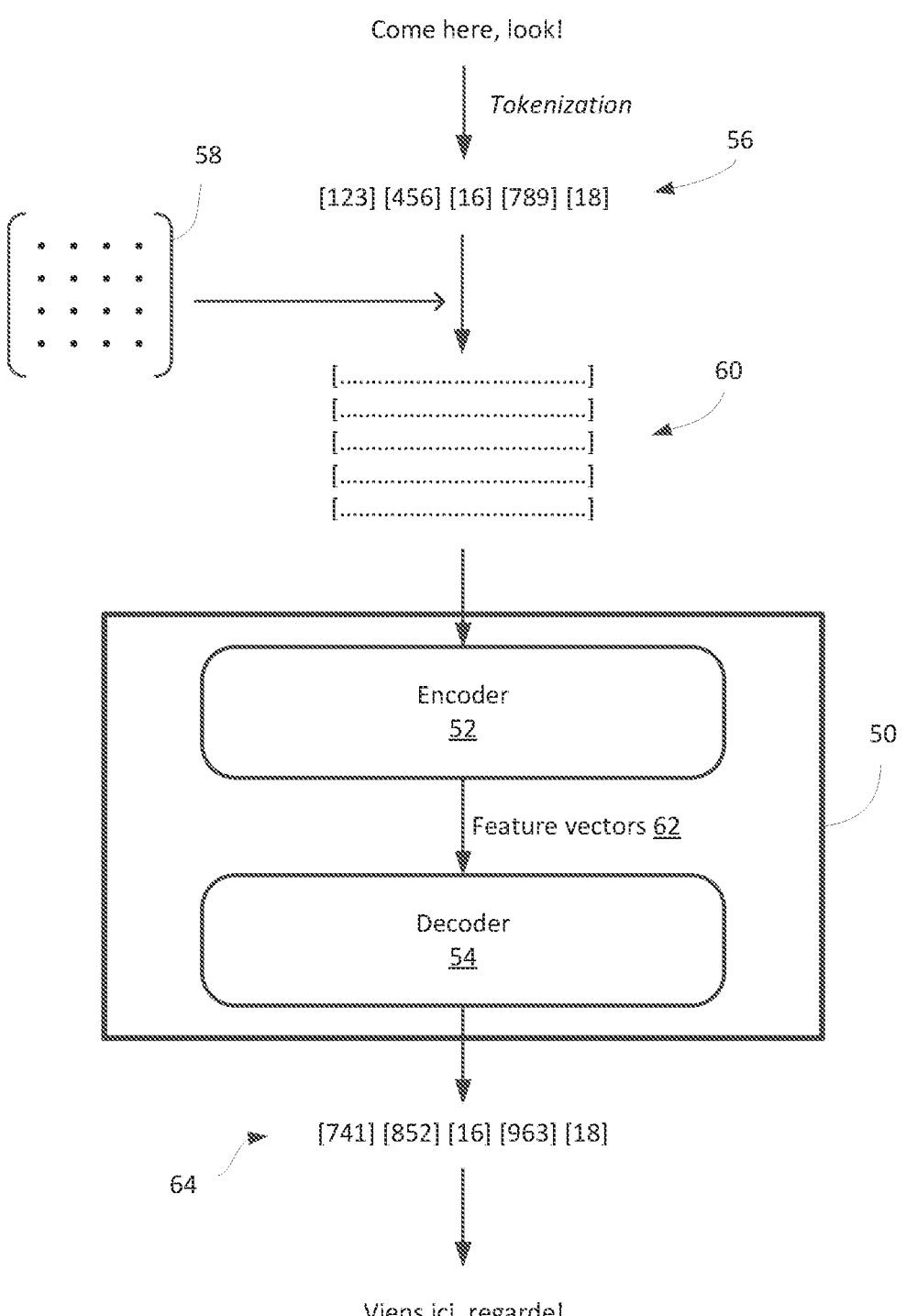
FIG. 5 shows a simplified diagram of an example transformer.

FIG. 5 is a simplified diagram of an example transformer 50, and a simplified discussion of its operation is now provided. The transformer 50 includes an encoder 52 (which may comprise one or more encoder layers/blocks connected in series) and a decoder 54 (which may comprise one or more decoder layers/blocks connected in series). Generally, the encoder 52 and the decoder 54 each include a plurality of neural network layers, at least one of which may be a self-attention layer. The parameters of the neural network layers may be referred to as the parameters of the language model.

The transformer 50 may be trained on a text corpus that is labelled (e.g., annotated to indicate verbs, nouns, etc.) or unlabelled. LLMs may be trained on a large unlabelled corpus. Some LLMs may be trained on a large multi-language, multi-domain corpus, to enable the model to be versatile at a variety of language-based tasks such as gen-erative tasks (e.g., generating human-like natural language responses to natural language input).

An example of how the transformer 50 may process textual input data is now described. Input to a language model (whether transformer-based or otherwise) typically is in the form of natural language as may be parsed into tokens. It should be appreciated that the term "token" in the context of language models and NLP has a different meaning from the use of the same term in other contexts such as data security. Tokenization, in the context of language models and NLP, refers to the process of parsing textual input (e.g., a character, a word, a phrase, a sentence, a paragraph, etc.) into a sequence of shorter segments that are converted to numerical representations referred to as tokens (or "compute tokens"). Typically, a token may be an integer that corre-sponds to the index of a text segment (e.g., a word) in a vocabulary dataset. Often, the vocabulary dataset is arranged by frequency of use. Commonly occurring text, such as punctuation, may have a lower vocabulary index in the dataset and thus be represented by a token having a smaller integer value than less commonly occurring text. Tokens frequently correspond to words, with or without whitespace appended. In some examples, a token may correspond to a portion of a word. For example, the word "lower" may be represented by a token for [low] and a second token for [er]. In another example, the text sequence "Come here, look!" may be parsed into the segments [Come], [here], [,], [look] and [!], each of which may be represented by a respective numerical token. In addition to tokens that are parsed from the textual sequence (e.g., tokens that correspond to words and punctuation), there may also be special tokens to encode non-textual information. For example, a [CLASS] token may be a special token that corresponds to a classification of the textual sequence (e.g., may classify the textual sequence as a poem, a list, a paragraph, etc.), a [EOT] token may be another special token that indicates the end of the textual sequence, other tokens may provide formatting information, etc.

In FIG. 5, a short sequence of tokens 56 corresponding to the text sequence "Come here, look!" is illustrated as input to the transformer 50. Tokenization of the text sequence into the tokens 56 may be performed by some pre-processing tokenization module such as, for example, a byte pair encoding tokenizer (the "pre" referring to the tokenization occurring prior to the processing of the tokenized input by the LLM), which is not shown in FIG. 5 for simplicity. In general, the token sequence that is inputted to the trans-former 50 may be of any length up to a maximum length defined based on the dimensions of the transformer 50 (e.g., such a limit may be 2048 tokens in some LLMs). Each token 56 in the token sequence is converted into an embedding vector 60 (also referred to simply as an embedding). An embedding 60 is a learned numerical representation (such as, for example, a vector) of a token that captures some semantic meaning of the text segment represented by the token 56. The embedding 60 represents the text segment corresponding to the token 56 in a way such that embeddings corresponding to semantically-related text are closer to each other in a vector space than embeddings corresponding to semantically-unrelated text. For example, assuming that the words "look", "see", and "cake" each correspond to, respectively, a "look" token, a "see" token, and a "cake" token when tokenized, the embedding 60 corresponding to the "look" token will be closer to another embedding corresponding to the "see" token in the vector space, as compared to the distance between the embedding 60 corresponding to the "look" token and another embedding corresponding to the "cake" token. The vector space may be defined by the dimensions and values of the embedding vectors. Various techniques may be used to convert a token 56 to an embedding 60. For example, another trained ML model may be used to convert the token 56 into an embedding 60. In particular, another trained ML model may be used to convert the token 56 into an embedding 60 in a way that encodes additional information into the embedding 60 (e.g., a trained ML model may encode positional information about the position of the token 56 in the text sequence into the embedding 60). In some examples, the numerical value of the token 56 may be used to look up the corresponding embedding in an embedding matrix 58 (which may be learned during training of the transformer 50).

The generated embeddings 60 are input into the encoder 52. The encoder 52 serves to encode the embeddings 60 into feature vectors 62 that represent the latent features of the embeddings 60. The encoder 52 may encode positional information (i.e., information about the sequence of the input) in the feature vectors 62. The feature vectors 62 may have very high dimensionality (e.g., on the order of thousands or tens of thousands), with each element in a feature vector 62 corresponding to a respective feature. The numerical weight of each element in a feature vector 62 represents the importance of the corresponding feature. The space of all possible feature vectors 62 that can be generated by the encoder 52 may be referred to as the latent space or feature space.

Conceptually, the decoder 54 is designed to map the features represented by the feature vectors 62 into meaningful output, which may depend on the task that was assigned to the transformer 50. For example, if the transformer 50 is used for a translation task, the decoder 54 may map the feature vectors 62 into text output in a target language different from the language of the original tokens 56. Generally, in a generative language model, the decoder 54 serves to decode the feature vectors 62 into a sequence of tokens. The decoder 54 may generate output tokens 64 one by one. Each output token 64 may be fed back as input to the decoder 54 in order to generate the next output token 64. By feeding back the generated output and applying self-attention, the decoder 54 is able to generate a sequence of output tokens 64 that has sequential meaning (e.g., the resulting output text sequence is understandable as a sentence and obeys grammatical rules). The decoder 54 may generate output tokens 64 until a special [EOT] token (indicating the end of the text) is generated. The resulting sequence of output tokens 64 may then be converted to a text sequence in post-processing. For example, each output token 64 may be an integer number that corresponds to a vocabulary index.

By looking up the text segment using the vocabulary index, the text segment corresponding to each output token 64 can be retrieved, the text segments can be concatenated together and the final output text sequence (in this example, "Viens ici, regarde!") can be obtained.

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that may be considered to be an encoder-only language model. A decoder-only language model accepts embeddings as input and may use auto-regression to generate an output text sequence. Transformer-XL and GPT-type models may be language models that are considered to be decoder-only language models.

Because GPT-type language models tend to have a large number of parameters, these language models may be considered LLMs. An example GPT-type LLM is GPT-3. GPT-3 is a type of GPT language model that has been trained (in an unsupervised manner) on a large corpus derived from documents available to the public online. GPT-3 has a very large number of learned parameters (on the order of hundreds of billions), is able to accept a large number of tokens as input (e.g., up to 2048 input tokens), and is able to generate a large number of tokens as output (e.g., up to 2048 tokens). GPT-3 has been trained as a generative model, meaning that it can process input text sequences to predictively generate a meaningful output text sequence. ChatGPT is built on top of a GPT-type LLM, and has been fine-tuned with training datasets based on text-based chats (e.g., chatbot conversations). ChatGPT is designed for processing natural language, receiving chat-like inputs and generating chat-like outputs.

A computing system may access a remote language model (e.g., a cloud-based language model), such as ChatGPT or GPT-3, via a software interface (e.g., an application programming interface (API)). Additionally or alternatively, such a remote language model may be accessed via a network such as, for example, the Internet. In some implementations such as, for example, potentially in the case of a cloud-based language model, a remote language model may be hosted by a computer system as may include a plurality of cooperating (e.g., cooperating via a network) computer systems such as may be in, for example, a distributed arrangement. Notably, a remote language model may employ a plurality of processors (e.g., hardware processors such as, for example, processors of cooperating computer systems). Indeed, processing of inputs by an LLM may be computationally expensive/may involve a large number of operations (e.g., many instructions may be executed/large data structures may be accessed from memory) and providing output in a required timeframe (e.g., real-time or near real-time) may require the use of a plurality of processors/cooperating computing devices as discussed above.

Inputs to an LLM may be referred to as a prompt, which is a natural language input that includes instructions to the LLM to generate a desired output. A computing system may generate a prompt that is provided as input to the LLM via its API. As described above, the prompt may optionally be processed or pre-processed into a token sequence prior to being provided as input to the LLM via its API. A prompt can include one or more examples of the desired output, which provides the LLM with additional information to enable the LLM to better generate output according to the desired output. Additionally or alternatively, the examples included in a prompt may provide inputs (e.g., example inputs) corresponding to/as may be expected to result in the desired outputs provided. A one-shot prompt refers to a prompt that includes one example, and a few-shot prompt refers to a prompt that includes multiple examples. A prompt that includes no examples may be referred to as a zero-shot prompt.

A computing system may access a remote system (e.g., a cloud-based system) to communicate with a remote language model or LLM hosted on the remote system such as, for example, using an application programming interface (API) call. The API call may include an API key to enable the computing system to be identified by the remote system. The API call may also include an identification of the language model or LLM to be accessed and/or parameters for adjusting outputs generated by the language model or LLM, such as, for example, one or more of a temperature parameter (which may control the amount of randomness or "creativity" of the generated output) (and/or, more generally some form of random seed as serves to introduce variability or variety into the output of the LLM), a minimum length of the output (e.g., a minimum of 10 tokens) and/or a maximum length of the output (e.g., a maximum of 1000 tokens), a frequency penalty parameter (e.g., a parameter which may lower the likelihood of subsequently outputting a word based on the number of times that word has already been output), a "best of" parameter (e.g., a parameter to control the number of times the model will use to generate output after being instructed to, e.g., produce several outputs based on slightly varied inputs). The prompt generated by the computing system is provided to the language model or LLM and the output (e.g., token sequence) generated by the language model or LLM is communicated back to the computing system. In other examples, the prompt may be provided directly to the language model or LLM without requiring an API call. For example, the prompt could be sent to a remote LLM via a network such as, for example, as or in message (e.g., in a payload of a message).

Object Detection and Tracking in Video

Reference is now made to FIG. 1, which shows an illustrative example of a series of video frames 106 and a system 100 for object identification in video. The system 100 may be implemented using one or more computing systems including memory and one or more processors configured to execute computer-readable instructions stored in memory to carry out some of the operations described herein. In particular, the computer-executable instructions may be configured to implement a first AI-assisted object detection algorithm 102 and a second AI-assisted object detection algorithm 104. The system 100 may be implemented in part using one or more remote systems connected by way of one or more computer networks, such as the Internet. The system 100 may be used to identify and track one or more objects in the series of video frames 106.

The first AI-assisted object detection algorithm 102 may be a promptable image segmentation model. The promptable image segmentation model may be a foundation model trained on a large dataset using supervised or self-supervised learning at scale. Foundation models tend to have the ability to generalize to new tasks and new data using prompt engineering, showing promise in zero-shot and few-shot learning. Prompts may be a pixel location or locations, bounding box, polygonal bounding shape, excluded pixel location or locations, in some cases. Prompt may be a text prompt in some cases or any other information indicating the target or object to be segmented. The first AI-assisted object detection algorithm 102 may be referred to as a promptable image segmentation model using prompt engineering.

An example of the first AI-assisted object detection algorithm 102 is the Segment Anything Model developed by Meta AI, https://research.facebook.com/publications/segment-anything, as described in Kirillov, A., et al., "Segment Anything", 2023, https://arxiv.org/abs/2304.02643, the contents of which are hereby incorporated by reference.

The second AI-assisted object detection algorithm 104 may utilize a diffusion-based generative model. While diffusion-based generative models are typically used in generating new images, they also exhibit the ability to identify correspondence between images.

An example of the second AI-assisted object detection algorithm 104 is the Diffusion FeaTures (DIFT) algorithm developed by researchers at Cornell University: https://diffusionfeatures.github.io/, as described by Tang, L., et al., "Emergent Correspondence from Image Diffusion", 2023, https://arxiv.org/pdf/2306.03881.pdf, the contents of which are hereby incorporated by reference. The DIFT algorithm may be based on any suitable image diffusion model, such as Stable Diffusion 2-1 (SD), developed by Stability AI Ltd., as described by R. Rombach, A. Blattmann, D. Lorenz, P. Esser, and B. Ommer, "High-resolution image synthesis with latent diffusion models", 2021. Another example is Ablated Diffusion Model (ADM), P. Dhariwal and A. Nichol, "Diffusion models beat gans on image synthesis", NeurIPS, 34: 8780-8794, 2021. Other diffusion models or evolutions of these models may be used in some implementations.

The first AI-assisted object detection algorithm 102 identifies an object and outputs a mask defining the location of the object within a video frame. It does so without reference to previous masks or frames in the video sequence. The second AI-assisted object detection algorithm 104 identifies an object (e.g. its mask) in a current image based on correspondence between the current image and a preceding image for which it has object location data, e.g. mask data, indicating the location of the object in the preceding image. In other words, the second AI-assisted object detection algorithm 104 bases its tracking of the mask/object in the current image on data regarding the location of the mask/object in the preceding image and diffusion-based correspondence analysis.

The term "mask" as used herein may refer to a set of pixels or one or more polygons defining the location of an object in an image. The mask may define the edges of the object in the image. The mask definition may specify all pixels that form part of the object. In some cases, the mask may be constrained to be a box or rectangle dimensioned as small as possible but still containing the whole of the object visible in the image.

The first AI-assisted object detection algorithm 102, e.g. a promptable image segmentation model using prompt engineering, may be highly accurate at identifying the location of an object and outputting a mask defining the location of that object in an image. In this respect, it is a strong choice for use in object detection within images; however, it has been found that use of such algorithms for object tracking in video can result in abrupt or jerky movement of the mask from frame-to-frame.

The second AI-assisted object detection algorithm 104 has shown promise in smoothly tracking correspondence between images and, in one example, in smoothly tracking an object mask from frame-to-frame in video. However, it may be less accurate in determining the initial mask that tracks the object to be segmented. Accordingly, in accordance with one aspect of the present application, the first AI-assisted object detection algorithm 102 is used to identify an initial mask and the second AI-assisted object detection algorithm 104 is then used to track that mask in temporally subsequent frames of the video.

In order to avoid potential drift of the second AI-assisted object detection algorithm 104 and the build up of error in mask accuracy, the present application further proposes the first AI-assisted object detection algorithm 102 be intermittently or periodically applied to find a next mask for certain frames and that the second AI-assisted object detection algorithm 104 is used to track the mask for frames between those certain frames. Those certain frames for which the first AI-assisted object detection algorithm 102 is used may be referred to herein as "keyframes". While the term "keyframes" may be used in video to denote certain frames in a particular video coding algorithm or process, the "keyframes" for the purpose of this application may or may not be the same as those frames, as will be described further below.

The series of video frames 106 may include one or more keyframes 108 (shown individually as 108a, 108b) and each keyframe 108a, 108b may have one or more temporally subsequent frames 110 between it and the next keyframe 108 in the series. The first AI-assisted object detection algorithm 102 is used to identify a first mask 112a in a first of the keyframes 108a. The first AI-assisted object detection algorithm 102 may output mask data 114 defining the location of the first mask 112a in the first of the keyframes 108a. The second AI-assisted object detection algorithm 104 is then used to track the location of the first mask 112a in the temporally subsequent frames 110 of the video based on determining corresponding pixels or other mask data in each temporally subsequent frame 110. In this manner, the second AI-assisted object detection algorithm 104 tracks the object in successive frames of the video using emergent correspondence that finds pixels or features in a second image that correspond to pixels or features in a first image.

At a second of the keyframes 108b, the first AI-assisted object detection algorithm 102 is then again used to determine a next mask 112b. The first AI-assisted object detection algorithm 102 outputs mask data 114 defining the location of the next mask 112b in the second of the keyframes 108b. The second AI-assisted object detection algorithm 104 is then used to track the location of the second mask 112b in the temporally subsequent frames 110 of the video following the second of the keyframes 108b.

In other words, the first AI-assisted object detection algorithm 102 is occasionally used to re-set the ground truth in terms of where the mask is located in the current image of the video, while the second AI-assisted object detection algorithm 104 is used to track the location of the mask in successive frames of video in between those re-sets.

It will be appreciated that the first AI-assisted algorithm performs segmentation on a video frame based on a prompt or prompt engineering to identify an object and define its location within the video frame. It outputs mask data defining that location. The second AI-assisted algorithm performs diffusion-model-based object tracking by determining correspondence between the current video frame and a previous video frame and, in particular, correspondence between an object identified in the previous video frame and its location and that same object in the current frame.

The system 100 identifies the keyframes 108 within the series of video frames 106 at which to use the first AI-assisted object detection algorithm 102. In one example, the system 100 identifies or selects the keyframes 108 based on a fixed periodicity. For example, every $10^{th}$ or $20^{th}$ frame in the series may be designated as a keyframe.

In another example, the system 100 may analyze the frames of the video to identify frames to designate as keyframes. For instance, the system 100 may detect a greater than threshold change in the image data in a frame vis-à-vis the previous frame using one or more distance metrics. In some instances, the system 100 may employ a scene-change detection algorithm to identify a video frame that marks a change in scene or perspective sufficiently significant enough to trigger a redetermination of the object location and resultant location of the mask.

In yet a further example, the system 100 may leverage work already done by an encoder during a video encoding process to identify frames that may serve as keyframes for the purpose of object detection and tracking. For instance, in many predictive coding algorithms, an encoder will encode some frames using intra-coding or intra-frame compression, in which the data compression process during encoding relies on spatial redundancy within the frame. Other frames may be encoded using inter-coding or inter-frame compression, in which the data compression process during encoding relies on temporal redundancy vis-à-vis one or more nearby frames. Inter-coding may employ forward or backward prediction in some compression algorithms. Intra-coding provides lower compression for many frames but has less risk of drift and can result in higher compression versus inter-coding when there are significant changes from frame-to-frame, such as at a scene change point. In some implementations of the present application, the system 100 may determine that any intra-coded frame is a keyframe for the purposes of object detection and tracking, and it may use the second AI-assisted object detection algorithm 104 for tracking the mask in the inter-coded frames between the intra-coded keyframes.

The system 100 may be implemented within a computing system and used on raw video data. In some cases, the system 100 may be implemented within a computing system that also includes a video encoder. In some cases, the system 100 may be implemented within a computing system that also includes a video decoder. In the latter case, the system 100 may be applied to decoded reconstructed video frames from the video decoder. The system 100 may further receive data from the video decoder identifying which of the frames were intra-coded or inter-coded. In some cases, that data may be embedded in the decoded reconstructed video frames as metadata. In some cases, a module or application implementing the video decoding process may output reconstructed video frames that are then received by a module or application implementing the object detection and tracking process. Data regarding whether frames were intra or inter coded may be included in metadata with the reconstructed video frames in some cases. Data regarding whether frames were intra or inter coded may be passed out-of-channel to the module implementing the object detection and tracking process together with the reconstructed video frames.

Figure 2:
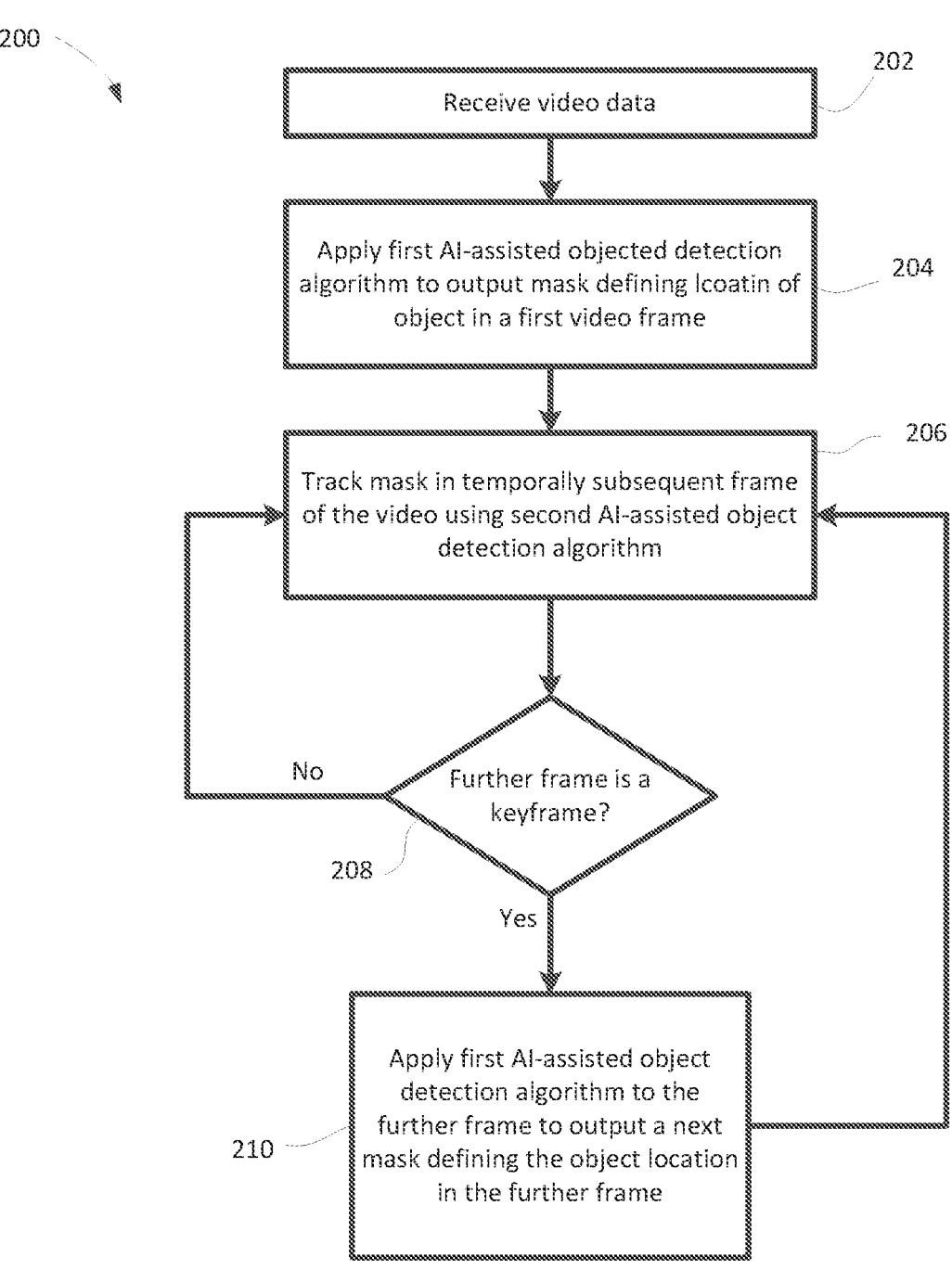
FIG. 2 shows, in flowchart form, a simplified method of AI-based object detection and tracking in video.

Reference will now be made to FIG. 2, which shows, in flowchart form, one example method 200 of object detection and tracking in video. The method 200 may be implemented on a computing device by way of processor-executable instructions stored in memory that, when executed by one or more processors, carry out the described operations. The computing device may include a video encoder and/or a video decoder in some cases. The computing device may include two or more computing devices connected by way of one or more computer networks. The method 200 may be used to output location data defining the location in each video frame of a particular object or objects. In some cases, the method 200 may include displaying the video on a display screen and identifying the particular object or objects within the displayed video frames. Objects may be identified by way of a bounding box or bounding shape containing the object, by way of a coloured or highlighted edge of the object, by way of a highlighted or coloured overlay atop the object, or in any other manner that visually indicates the location of the objection within the video frame. The location is based on mask data determined using the method 200, where the mask data defines the location of the object. The mask data may include data defining the pixels that comprise the portion of the object visible in the frame. In some cases, the mask data may include data defining the outline of the portion of the object visible in the frame. The mask data may include pixel locations, line definitions, or other positional data.

In operation 202, the computing system receives video data. The video data may be compressed or uncompressed. If compressed, then operation 202 may include decoding the video data to generate reconstructed video data in the form of a series of video frames. Each video frame includes pixel data.

In operation 204, the computing system applies the first AI-assisted object detection algorithm to a first frame of video data to output a mask defining the location of the detected object in the first frame. As explained further below, the term "first frame" does not necessarily imply that the frame is the very first frame of the video sequence.

The first AI-assisted object detection algorithm may include a promptable image segmentation model using prompt engineering. Operation 204 may include receiving a prompt in some cases, such as text or selection of a point or points within the frame. For example, the computing system may receive, through a user interface device or via a computer network communication (e.g. through a website, via an HTTP connection or the like), a text prompt such as "dog", "yellow car", or "man walking with a cane". The prompt may be used by the first AI-assisted object detection algorithm to identify the desired object in the frame. In some situations, the first AI-assisted object detection algorithm may determine that the desired object does not appear in the frame or does not appear in the frame with sufficient confidence to trigger a detected object condition. In this example, however, the first AI-assisted object detection algorithm detects an object in the frame. In some cases, the first AI-assisted object detection algorithm may detect objects without an input prompt. For example, the first AI-assisted object detection algorithm may be pre-configured to detect and classify certain categories of objects, such as people, cars, animals, physical objects, etc., as part of a computer-vision system. In some cases, the first AI-assisted object detection algorithm may be configured to identify objects without a prompt and the computing system may permit or receive user input selecting one of the identified objects to be tracked in the video.

The first frame at which the first AI-assisted object detection algorithm is applied may be a keyframe identified by the computing system based on it being the first frame of the video. In some cases, the first frame may not be the first frame of the video. For example, if based on a user input of a prompt, such as a pixel selection during video playback, the first frame may be the frame in which the pixel selection is received. In some cases, if a prompt or other object detection initiation precedes playback of the video, then the first AI-assisted object detection algorithm may be applied to each frame starting with the first frame until the object is detected in at least one frame and that frame then serves as the first frame for operation 204.

After the first AI-assisted object detection algorithm identifies the location of the object and outputs mask data defining its location in the first frame, then in operation 206 the second AI-assisted object detection algorithm is used to determine the location of the object (e.g. the mask) in a temporally subsequent frame, e.g. the next frame in the video sequence. The second AI-assisted object detection algorithm may be a diffusion-based generative model configured to determine correspondence between a first image and a second image and, in particular, to determine the location of an object (e.g. the mask) identified in the first image within the second image.

The output from the second AI-assisted object detection algorithm may be mask data defining the location of the detected object in the second image, i.e. the temporally subsequent frame of video. In some cases, the mask data may include data defining the pixels that comprise the portion of the object visible in the frame, data defining the outline of the portion of the object visible in the frame, or other positional data defining the location of the object in the frame. In some cases, the mask data output by the second AI-assisted object detection algorithm may be differential data defining the difference between the location of the mask data in a preceding frame and the location of the mask data in a current frame. The differential data may be between the current frame and the immediately prior frame or between the current frame and the most-recently determined keyframe.

In operation 208, the computer system determines whether the next frame (i.e. a "further frame") in the video sequence is a keyframe. If not, then the method 200 returns to operation 206 to continue using the second AI-assisted object detection algorithm to track the location of the object in the further frame. If the further frame is a keyframe, then the method 200 proceeds to operation 210 in which the system again uses the first AI-assisted object detection algorithm to find the object within the further frame and its mask data (i.e. the "next" mask). The next mask may be determined by the first AI-assisted object detection algorithm without reference to the original mask previously determined. That is, the first AI-assisted object detection algorithm may be configured to operate on the further frame anew to find the object and define its mask location. This may be considered "resetting" the ground truth in terms of the objection location. The method 200 then loops to operation 206 to begin tracking the next mask in subsequent frames of the video until a next keyframe is encountered.

It will be appreciated that operation 208 involves the determination that a frame of the video is a keyframe. In one implementation, the determination is based on a fixed periodicity in which every Nth frame is deemed to be a keyframe.

In another implementation, the determination is based on an analysis of each frame by the computing system. For example, the computing system may employ a scene change detection algorithm to determine when a frame represents a scene change. The algorithm may detect a more-than-threshold change in pixel values (luma, chrominance, or both) in the frame as compared to the preceding frame and, on that basis, determine that the frame represents a scene change and designate it as a keyframe. In another example, the system may analyze each frame to determine when the pixel values have drifted/changed by more than a threshold amount since the last keyframe. In some cases, the computing system may use a combination of factors. For instance, the system may analyze frames to detect change/drift in pixel values but may also impose a maximum distance between keyframes. That is, if a change/drift in pixel values does not result in detecting a keyframe by the Nth frame, then the Nth frame is nevertheless treated as a keyframe.

In a further implementation, the determination may be based on video compression coding. As described above, frames that are intra-coded (i.e. without reference to adjacent frames) may be determined to be keyframes, while frames that are inter-coded (i.e. based on one or more temporally nearby frames) are not keyframes. Because the encoder has already undertaken the computationally complex activity of determining whether to inter or intra code a frame, the present method 200 may leverage that work to identify keyframes based on them being intra-coded.

In one variation, instead of applying the first AI-assisted object detection algorithm to every keyframe identified, the method 200 only applies it to every Nth keyframe, such as every second, third, or fourth keyframe. Put another way, the method 200 may only identify every Nth intra-coded frame as a keyframe.

In yet a further implementation, the determination may be based on detecting drift between the location of a mask determined by the first AI-assisted object detection algorithm and the location of a mask tracked by the second AI-assisted object detection algorithm. That is, while the second AI-assisted object detection algorithm is used to smoothly track location of the mask in frames following a keyframe, the first AI-assisted object detection algorithm is used in parallel to determine where it would determine the mask to be located in those frames. If the difference between the locations of the two determined masks using the two different algorithms in a given frame is greater than a threshold amount, then the system may determine that the current frame is a keyframe and may use the mask determined by the first AI-assisted object detection algorithm instead. In that manner, it assesses whether the second algorithm's mask tracking has drifted by more than a threshold amount from the location that the first algorithm would otherwise have determined and, if so, the system resets the mask location using the first algorithm's output.

Figure 3:
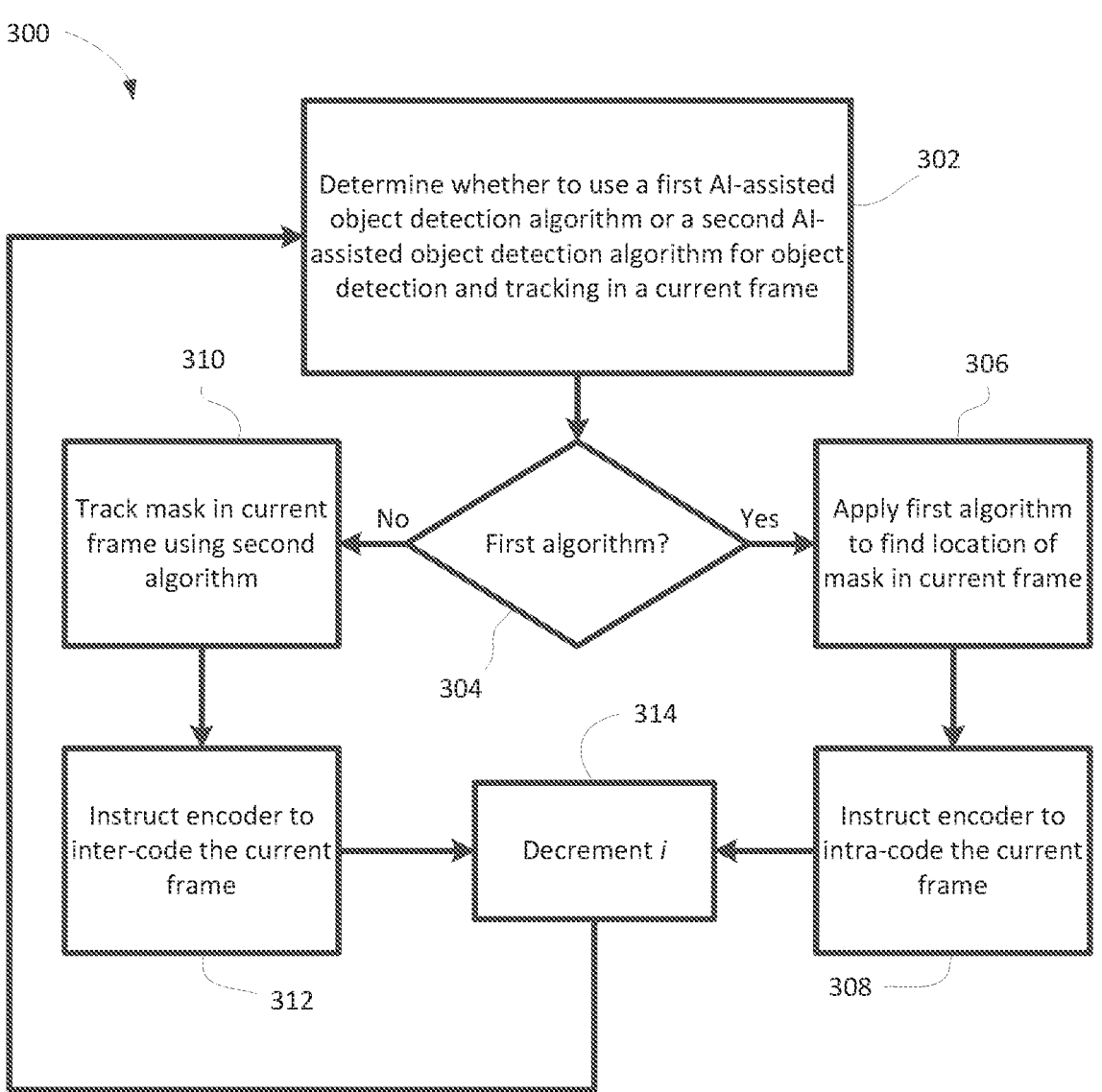
FIG. 3 shows, in flowchart form, a simplified method of combining AI-based object detection and tracking in video with video encoding to improve coding computational efficiency.

In another aspect, the present application describes a process of using the above-described object-tracking process within an encoder to guide the encoding process. Reference is now made to FIG. 3, which shows a method 300 of object tracking in video.

The method 300 includes determining, for a current frame of the video, whether to use the first AI-assisted object tracking algorithm or the second AI-assisted object tracking algorithm, as indicated by operations 302 and 304. With a first frame, the method 300 would employ the first AI-assisted object tracking algorithm since there is no previously detected object and determined mask to track in the current frame. With subsequent frames, however, the method 300 assesses which of the algorithms to use. The determination may be based on determining whether the current frame is to be designated as a keyframe or not. The determination to use the first AI-assisted object detection algorithm instead of the second AI-assisted object detection algorithm may be based on an analysis of the video frame pixel data. In particular, it may be based on determining whether the pixel has changed vis-à-vis the preceding frame in the video by more than a threshold amount. A scene-change-detection algorithm may be used in some cases. In some cases, the method 300 may include determining an average luminosity or average chrominance value for each frame and comparing successive frames to detect when there is a greater than threshold change in one or more of those values.

If the system determines that the first AI-assisted object detection algorithm is to be used, then in operation 306 it applies the first AI-assisted object detection algorithm to detect the desired object within the current frame and determine a mask defining its location in the frame. As noted above, the object detection may be based on a prompt in some cases. In some cases, the system may be preconfigured to detect particular categories or classes of objects. In some cases, the method 300 includes tracking the location of two or more objects in the video.

After determining and outputting the mask data, the method 300 includes instructing a video encoder to code the current frame using a spatial compression mode, such as intra-coding. The instruction may include setting a flag within the metadata of the current video frame or within a memory location associated with the current video frame, sending a signal to the video encoder, or otherwise signalling to the encoder that the first AI-assisted object detection algorithm was used in connection with the current frame. On that basis, the encoder may then configure itself to encode the current frame using a particular mode, such as intra-coding, without necessarily needing to perform its conventional analysis of the video to determine which coding mode to use. In that sense, the encoder leverages the computational analysis work done by the object detection and tracking process as the basis for its coding decision, thereby reducing the computational burden on the encoder.

If, in operations 302 and 304, it is determined that the second AI-assisted object detection algorithm is to be used with the current frame to track the location of the object, then in operation 310 the second AI-assisted object detection algorithm is applied to do so. In operation 312, the system signals to the video encoder that the current frame employed the second AI-assisted object detection algorithm to track one or more objects. As noted above, the signalling may include setting a flag or other indicator within the metadata associated with the current video frame, setting a flag or other indicator in a memory location associated with the current video frame, sending a signal or message to the video encoder, etc. In some cases, either operation 312 or operation 308 may be implemented through not setting a flag or other indicator or sending a signal. That is, the video encoder may be configured to assume that the current frame used either the first or second AI-assisted object detection algorithm as a default and may only be signaled if that is not the case.

In operation 314, the system moves to the next frame in the video sequence and returns to operation 302 to determine which algorithm to use for objection detection and/or tracking in that next frame.

Figure 4A:
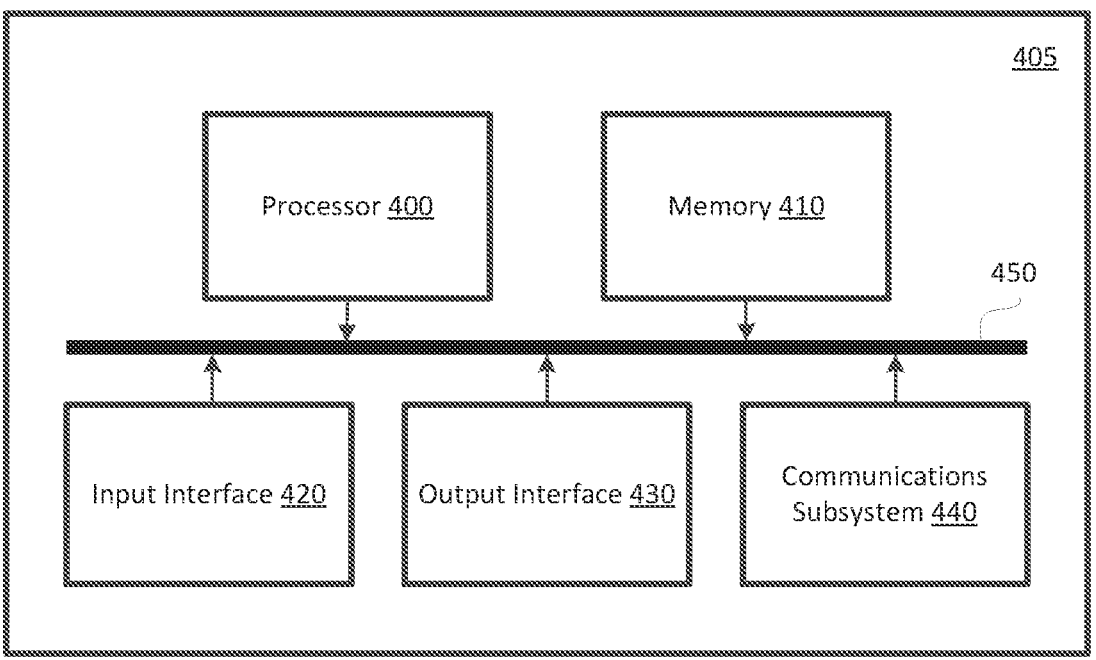
FIG. 4A is a high-level schematic diagram of an example computing device.

The above-described methods may be implemented by way of a suitably programmed computing device. FIG. 4A is a high-level operation diagram of an example computing device 405. The example computing device 405 may include a processor 400, a memory 410, an input interface 420, an output interface 430, and a communications subsystem 440. As illustrated, the foregoing example elements of the example computing device 405 are in communication over a bus 450.

The processor 400 is a hardware processor. The processor 400 may, for example, be one or more ARM, Intel x86, PowerPC processors or the like.

The memory 410 allows data to be stored and retrieved. The memory 410 may include, for example, random access memory, read-only memory, and persistent storage. Persistent storage may be, for example, flash memory, a solid-state drive or the like. Read-only memory and persistent storage are a computer-readable medium. A computer-readable medium may be organized using a file system such as may be administered by an operating system governing overall operation of the example computing device 405.

The input interface 420 allows the example computing device 405 to receive input signals. Input signals may, for example, correspond to input received from a user. The input interface 420 may serve to interconnect the example computing device 405 with one or more input devices. Input signals may be received from input devices by the input interface 420. Input devices may, for example, include one or more of a touchscreen input, keyboard, trackball or the like. In some embodiments, all or a portion of the input interface 420 may be integrated with an input device. For example, the input interface 420 may be integrated with one of the aforementioned examples of input devices.

The output interface 430 allows the example computing device 405 to provide output signals. Some output signals may, for example allow provision of output to a user. The output interface 430 may serve to interconnect the example computing device 405 with one or more output devices. Output signals may be sent to output devices by output interface 430. Output devices may include, for example, a display screen such as, for example, a liquid crystal display (LCD), a touchscreen display. Additionally, or alternatively, output devices may include devices other than screens such as, for example, a speaker, indicator lamps (such as, for example, light-emitting diodes (LEDs)), and printers. In some embodiments, all or a portion of the output interface 430 may be integrated with an output device. For example, the output interface 430 may be integrated with one of the aforementioned example output devices.

The communications subsystem 440 allows the example computing device 405 to communicate with other electronic devices and/or various communications networks. For example, the communications subsystem 440 may allow the example computing device 405 to send or receive communications signals. Communications signals may be sent or received according to one or more protocols or according to one or more standards. For example, the communications subsystem 440 may allow the example computing device 405 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally, or alternatively, the communications subsystem 640 may allow the example computing device 605 to communicate using near-field communication (NFC), via Wi-Fi™, using Bluetooth™ or via some combination of one or more networks or protocols. Contactless payments may be made using NFC. In some embodiments, all or a portion of the communications subsystem 440 may be integrated into a component of the example computing device 405. For example, the communications module may be integrated into a communications chipset.

Software comprising instructions is executed by the processor 400 from a computer-readable medium. For example, software may be loaded into random-access memory from persistent storage of memory 410. Additionally, or alternatively, instructions may be executed by the processor 400 directly from read-only memory of memory 410.

Figure 4B:
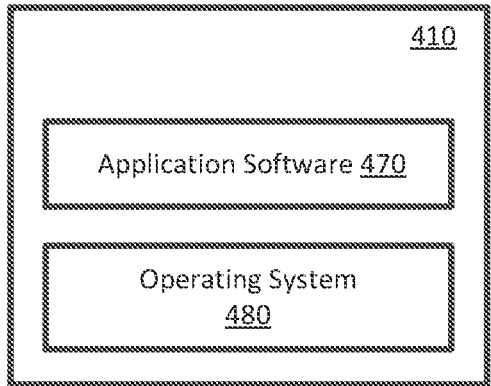
FIG. 4B shows a simplified organization of software components stored in a memory of the computing device of FIG. 4A.

FIG. 4B depicts a simplified organization of software components stored in memory 410 of the example computing device 405. As illustrated these software components include an operating system 480 and application software 470.

The operating system 480 is software. The operating system 480 allows the application software 470 to access the processor 400, the memory 410, the input interface 420, the output interface 430, and the communications subsystem 440. The operating system 480 may be, for example, Apple™ OS X, Android™, Microsoft™ Windows™, a Linux distribution, or the like.

The application software 470 adapts the example computing device 405, in combination with the operating system 480, to operate as a device performing particular functions. Implementations The methods and systems described herein may be deployed in part or in whole through a machine that executes computer software, program codes, and/or instructions on a processor. The processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In some embodiments, the process may be a dual core processor, quad core processors, other chip-level multiprocessor and the like that combine two or more independent cores (called a die).

The methods and systems described herein may be deployed in part or in whole through a machine that executes computer software on a server, cloud server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented in different devices which may operate in wired or wireless networks. Examples of wireless networks include 4th Generation (4G) networks (e.g., Long-Term Evolution (LTE)) or 5th Generation (5G) networks, as well as non-cellular networks such as Wireless Local Area Networks (WLANs). However, the principles described therein may equally apply to other types of networks.

The operations, methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another, such as from usage data to a normalized usage dataset.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable devices, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The invention claimed is:

1. A computer-implemented method, comprising:
identifying an object in a first video frame of a video by applying a first AI-assisted object detection algorithm that outputs a mask defining location of the object in the first video frame, wherein the first AI-assisted object detection algorithm includes a promptable image segmentation model;
tracking the mask and defining its location in at least one temporally subsequent frame of the video using a second AI-assisted object detection algorithm, wherein the second AI-assisted object detection algorithm includes a diffusion-based generative model; and
determining that a further frame of the video is a keyframe and, on that basis, re-applying the first AI-assisted objected detection algorithm to identify the object in the further frame and to output a next mask defining the location of the object in the further frame before repeating the tracking and defining using the second AI-assisted object detection algorithm for one or more frames subsequent to the keyframe.

2. The method of claim 1, wherein the first AI-assisted object detection algorithm determines the mask defining location of the object in the first video frame without reference to preceding frames of the video or previously-determined masks for the video, and wherein the second AI-assisted object detection algorithm tracks the mask and defines its location in the at least one temporally subsequent frame of the video based on a location of the mask in a preceding frame and a determination of correspondence between the preceding frame and the at least one temporally subsequent frame.

3. The method of claim 1, wherein determining that the further frame is a keyframe includes receiving keyframe identification data from at least one of a video encoder and a video decoder regarding the video.

4. The method of claim 3, wherein the keyframe identification data includes data identifying frames within decoded video that are keyframes.

5. The method of claim 3, wherein receiving keyframe identification data includes extracting the keyframe identification data from decoded video.

6. The method of claim 1, wherein determining that the further frame is a keyframe in based on determining that the further frame was intra-coded by an encoder.

7. The method of claim 1, wherein determining that the subsequent frame is a keyframe includes performing scene change analysis on the video and determining that the subsequent frame is a scene change.

8. The method of claim 1, wherein determining that the further frame is a keyframe includes tracking the mask and defining its location in the further frame of the video using the second AI-assisted object detection algorithm, applying the first AI-assisted object detection algorithm to identify a new mask defining a location of the object in the further frame, comparing the new mask to the location of the mask determined by the second AI-assisted object detection algorithm, and determining that an error measurement exceeds a threshold value.

9. The method of claim 8, wherein the operations of tracking the mask and defining its location in the further frame, applying the first AI-assisted object detection algorithm to identify the new mask, comparing the new mask to the location of the mask determined by the second AI-assisted object detection algorithm, and determining the error measurement are carried out only on frames of the video that were intra-coded.

10. The method of claim 1, further comprising displaying the video on a display screen with a visual overlay indicating the object based on the mask and the next mask.

11. A non-transitory processor-readable medium storing processor-executable instructions that, when executed by one or more processors, are to cause the one or more processors to:

identify an object in a first video frame of a video by applying a first AI-assisted object detection algorithm that outputs a mask defining location of the object in the first video frame, wherein the first AI-assisted object detection algorithm includes a promptable image segmentation model;

track the mask and define its location in at least one temporally subsequent frame of the video using a second AI-assisted object detection algorithm, wherein the second AI-assisted object detection algorithm includes a diffusion-based generative model; and determine that a further frame of the video is a keyframe and, on that basis, re-apply the first AI-assisted objected detection algorithm to identify the object in the further frame and to output a next mask defining the location of the object in the further frame before repeating the tracking and defining using the second AI-assisted object detection algorithm for one or more frames subsequent to the keyframe.

12. The non-transitory processor-readable medium of claim 11, wherein the first AI-assisted object detection algorithm determines the mask defining location of the object in the first video frame without reference to preceding frames of the video or previously-determined masks for the video, and wherein the second AI-assisted object detection algorithm tracks the mask and defines its location in the at least one temporally subsequent frame of the video based on a location of the mask in a preceding frame and a determination of correspondence between the preceding frame and the at least one temporally subsequent frame.

13. The non-transitory processor-readable medium of claim 11, wherein the instructions, when executed, are to cause the one or more processors to determine that the further frame is a keyframe by at least receiving keyframe identification data from at least one of a video encoder and a video decoder regarding the video.

14. The non-transitory processor-readable medium of claim 13, wherein the keyframe identification data includes data identifying frames within decoded video that are key-frames.

15. The non-transitory processor-readable medium of claim 13, wherein receiving keyframe identification data includes extracting the keyframe identification data from decoded video.

16. The non-transitory processor-readable medium of claim 11, wherein the instructions, when executed, are to cause the one or more processors to determine that the further frame is a keyframe by determining that the further frame was intra-coded by an encoder.

17. The non-transitory processor-readable medium of claim 11, wherein the instructions, when executed, are to cause the one or more processors to determine that the subsequent frame is a keyframe by performing scene change analysis on the video and determining that the subsequent frame is a scene change.

18. The non-transitory processor-readable medium of claim 11, wherein the instructions, when executed, are to cause the one or more processors to determine that the further frame is a keyframe by tracking the mask and defining its location in the further frame of the video using the second AI-assisted object detection algorithm, applying the first AI-assisted object detection algorithm to identify a new mask defining a location of the object in the further frame, comparing the new mask to the location of the mask determined by the second AI-assisted object detection algorithm, and determining that an error measurement exceeds a threshold value.

19. The non-transitory processor-readable medium of claim 18, wherein the operations of tracking the mask and defining its location in the further frame, applying the first AI-assisted object detection algorithm to identify the new mask, comparing the new mask to the location of the mask determined by the second AI-assisted object detection algorithm, and determining the error measurement are carried out only on frames of the video that were intra-coded.

20. The non-transitory processor-readable medium of claim 11, wherein the instructions, when executed, are to cause the one or more processors to display the video on a display screen with a visual overlay indicating the object based on the mask and the next mask.

21. A computing system, comprising:

one or more processors; and memory coupled to at least one of the one or more processors, the memory storing computer-executable instructions that, when executed by the one or more processors, are to cause the one or more processors to:

identify an object in a first video frame of a video by applying a first AI-assisted object detection algorithm that outputs a mask defining location of the object in the first video frame, wherein the first AI-assisted object detection algorithm includes a promptable image segmentation model;

track the mask and define its location in at least one temporally subsequent frame of the video using a second AI-assisted object detection algorithm, wherein the second AI-assisted object detection algorithm includes a diffusion-based generative model; and determine that a further frame of the video is a key-frame and, on that basis, re-apply the first AI-assisted objected detection algorithm to identify the object in the further frame and to output a next mask defining the location of the object in the further frame before repeating the tracking and defining using the second AI-assisted object detection algorithm for one or more frames subsequent to the keyframe.

* * * * *